United States Patent [19]

Yamashita et al.

[11] 4,321,637
[45] Mar. 23, 1982

[54] RECORDING-REPRODUCTION APPARATUS FOR AN ENDLESS TAPE

[75] Inventors: Hiroshi Yamashita; Fumio Izawa, both of Yokohama; Seiichi Yanagida, Hiratsuka, all of Japan

[73] Assignee: Tokyo Shibaura Denki Kabushiki Kaisha, Kawasaki, Japan

[21] Appl. No.: 90,696

[22] Filed: Nov. 2, 1979

[30] Foreign Application Priority Data

Nov. 9, 1978 [JP] Japan .............................. 53-137325

[51] Int. Cl.³ ...................... G11B 15/60; G11B 15/43; G11B 23/06
[52] U.S. Cl. .............................. 360/93; 242/55.19 R; 360/130.1
[58] Field of Search ............. 360/90, 93, 130.1, 130.2, 360/130.31; 242/55.17, 55.19 R, 55.19 A

[56] References Cited

U.S. PATENT DOCUMENTS

| | | | |
|---|---|---|---|
| 2,699,332 | 1/1955 | MacKenzie | 360/93 |
| 2,852,254 | 9/1958 | Reiskind | 242/55.19 R |
| 3,149,207 | 9/1964 | Maxey | 242/55.19 R |
| 3,287,508 | 11/1966 | Morrison | 360/93 |
| 3,311,315 | 3/1967 | Stark | 360/93 |
| 4,040,114 | 8/1977 | Jenkins | 360/130.1 |

*Primary Examiner*—Alfred H. Eddleman
*Attorney, Agent, or Firm*—Oblon, Fisher, Spivak, McClelland & Maier

[57] ABSTRACT

A recording and/or reproduction apparatus for an endless tape which includes a hollow fixed reel, the outer wall of which is wound with an endless tape which is conducted from the innermost portion and wound onto the outermost side a head mechanism for scanning the thus guided tape, a pinch roller and capstan which are driven with the tape held therebetween thereby causing the tape to be slackened downstream of the capstan, a swingable arm which releases the pinch roller from the capstan before its rotation is brought to an end, and a guide pin for releasing the tape from the head mechanism, capstan and pinch roller.

9 Claims, 3 Drawing Figures

RECORDING-REPRODUCTION APPARATUS FOR AN ENDLESS TAPE

BACKGROUND OF THE INVENTION

Field of the Invention

This invention relates to a recording and/or reproduction apparatus for an endless tape wound about a stationary or fixed reel.

Description of the Prior Art

Where, with the known recording-reproduction apparatus of the above-mentioned type, a tape received in a cassette is changed from a running state to a rest state, a pinch roller and capstan driven with the tape clamped therebetween are first brought to rest, and subsequently the pinch roller is released from the capstan to set the tape free from being held therebetween. A tape guide for guiding the tape in contact with a magnetic head mechanism is retracted to disengage the magnetic tape from the magnetic head mechanism. However, where, with the above-mentioned prior art recording-reproduction apparatus, the tape is brought to rest without slackening, and then is pulled from the reel, while being conducted by the tape guide. This pulling of the tape thus has to be carried out with a great force. Moreover, where the tape is pulled under such condition, that the innermost portion of the tape wound about the reel is pressed against the outer periperal surface of the reel. When, therefore, the tape in made to run again, a considerable pulling force has to be applied to the tape, thus excessively straining the tape. Obviously, the travelling tape is sometimes brought to rest in a slackened state. However, the degree of such slackening is changed from time to time. If the tape is brought to rest in a very slightly slackened or greatly strained state, then the abovementioned difficulties will arise. Further, where the tape runs in an unnecessarily slackened state, then such excessively slackened portions of the tape touch the drive mechanism, failing to provide the desired free condition of the tape.

SUMMARY OF THE INVENTION

It is accordingly the object of this invention to provide a recording and/or reproduction apparatus for an endless tape, which can bring the travelling tape to rest without much straining being transferred to the and tape, can easily release the tape from the drive mechanism, and run the tape again without applying a great force.

According to an aspect of this invention, these is provided a recording and/or reproduction apparatus for an endless tape which includes; a hollow fixed reel, the outer wall of which is wound with an endless tape; a guide mechanism for conducting the innermost portion of the tape wound about the outer wall of the hollow fixed reel from the inner wall of the hollow fixed reel on to the outermost side of the roll of said wound tape; a head for recording-reproducing operation of the tape thus guided; and a pinch roller and capstan which are driven with the tape held therebetween thereby causing the tape to form a slackened portion downstream of the capstan, a pinch roller drive member which releases the pinch roller from the capstan before rotation of the capstan is brought to an end, and tape portion biasing means for releasing the tape from the scanning mechanism, capstan and pinch roller.

BRIEF DESCRIPTION OF THE DRAWINGS

This invention can be more fully understood from the following detailed description when taken in conjunction with the accompanying drawings, in which.

DETAILED DESCRIPTION OF THE PREFERRED EMBODIMENTS

There wil now be described by reference to the accompanying drawings the arrangement and operation of a recording-reproduction apparatus embodying this invention for an endless tape.

Figure 1:
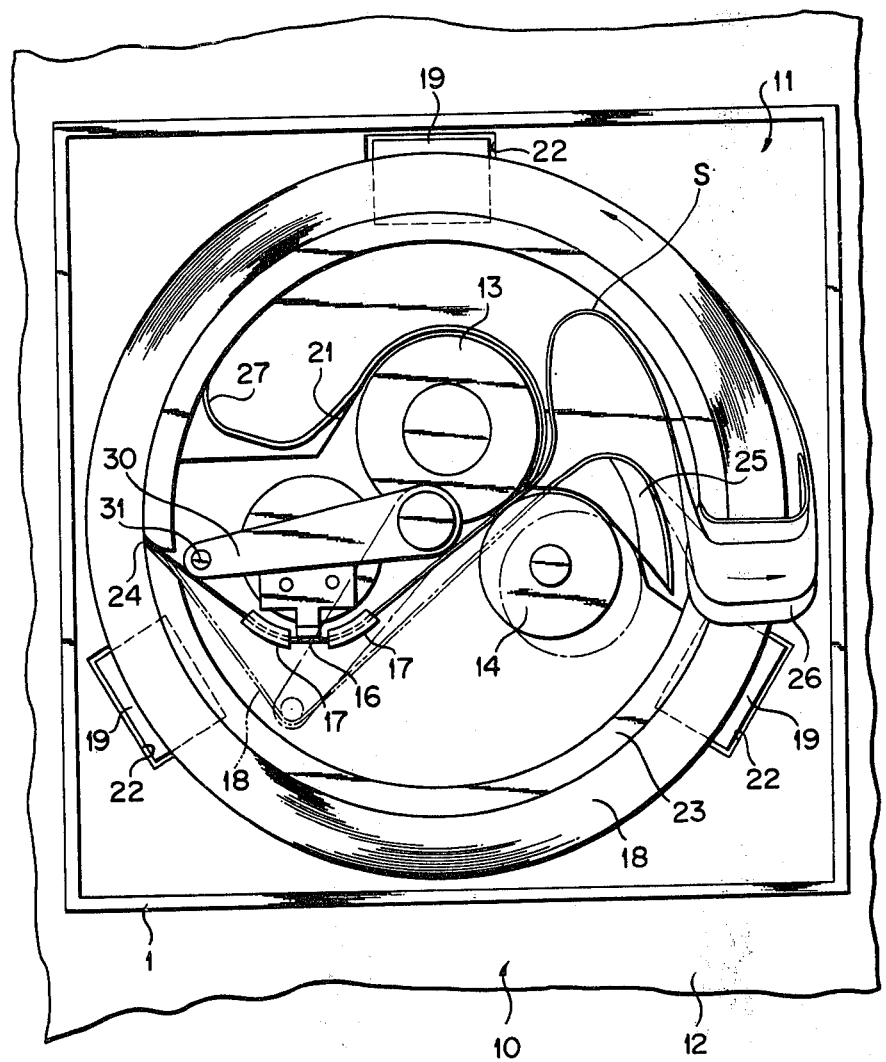
FIG. 1 is a plan view of a recording-reproduction apparatus for an endless tape enbodying this invention.
Figure 2:
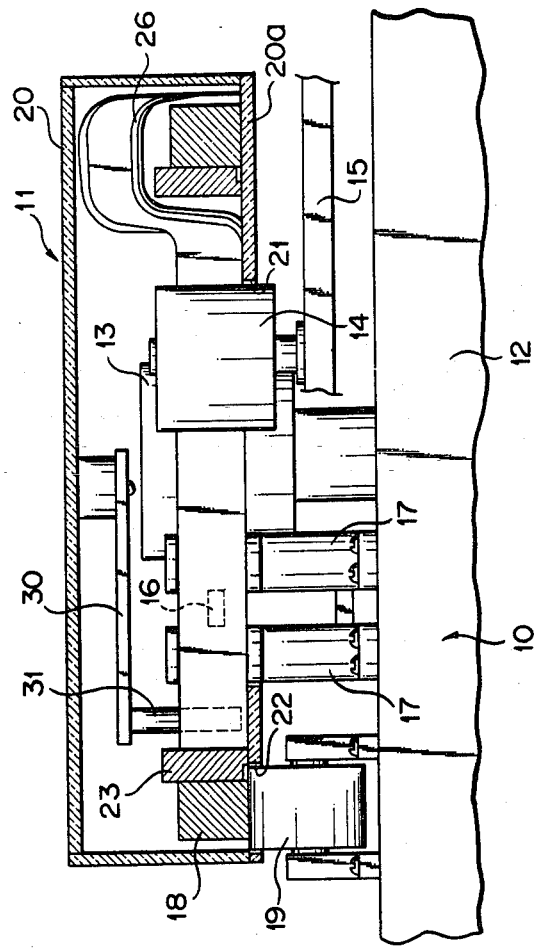
FIG. 2 is a schematic sectional view of said recording-reproduction apparatus.

Referring to FIGS. 1 and 2, reference numeral 10 denotes the body of a tape drive mechanism or recording-reproduction apparatus embodying this invention. A tape cassette 11 is detachably mounted on the body 10 of the recording-reproduction apparatus. Body 10 includes a tape drive mechanism formed of a capstan 13 and pinch roller 14, both of which are rotatably set on a substrate 12. The pinch roller 14 is rotatably mounted at one end of a swingable arm 15 which rotates along the surface of the substrate 12, and the other end of which is rotatably supported on the substrate 12. The pinch roller 14 is engaged with or disengaged from the capstan 13 according to the direction in which the S arm 15 is rotated and thereby causes the tape to form a slackened portion downstream of capstan 13 as shown in FIG. 1.

Provided on the surface of the substrate 12 are a recording-reproducing head 16 and a pair of tape guide members 17. The paired tape guide members 17 are so set on both sides of the magnetic head 16 as to slidingly contact the recorded plane of a magnetic tape as is head 16.

This arrangement stabilizes the sliding contact of the head 16 with the recording-reproducing tape 18. Three rubber rollers 19 are disposed on the substrate 12 equiangularly along the periphery of the roll of the wound tape 18 in contact with the underside of the roll of the wound tape 18, thereby preventing the roll of the wound tape 18 from being unnecessarily expanded by the centrifugal force occurring when the roll of the tape 18 is rotated.

The tape cassette 11 includes a parallelepiped transparent housing 20 prepared from synthetic resin. The bottom wall 20a of the housing 20 is provided with a first opening 21 and three second openings 22. The first opening 21 allows for the insertion into the housing 20 of the tape drive mechanism (capstan 13 and pinch roller 14) and tape-scanning mechanism (head 16 and guide members 17). The second openings 22 allow for the insertion of the rubber rollers 19 into the housing 20. A hollow reel 23 is fixed in the housing 20. The tape drive mechanism and tape-scanning mechanism are to be disposed in the hollow fixed reel 23. The rubber rollers 19 are pressed against the underside of the roll of the tape 18 wound about the outer wall of the fixed reel 23. A slit or tape-guiding opening 24 is cut out at the periphery of the fixed reel 23 to extend from the inner to the outer wall thereof. The tape 18 wound about the outer wall of the fixed reel 23 is guided to the scanning mechanism, starting with the inner most portion of the tape 18.

Reference numerals 25, 26 denote first and second guide plates for conducting the tape 18 which has been carried from the scanning mechanism to the drive mechanism and pulled from between the capstan 13 and pinch roller 14 of the drive mechanism on to the outermost side of the roll of the tape 18 already wound about the outer wall of the fixed reel 23. The first guide plate 25 is provided on the inner wall of the hollow fixed reel 23. The second guide plate 26 is so disposed as to cross the edge of the wall of the hollow fixed reel 23. Reference numeral 27 of FIG. 1 denotes a protective plate so set as to surround part of the outer wall of the capstan 13. This protective plate 27 prevents the slackened portion S of the tape 18 formed downstream of the drive mechanism from being unduly expanded.

Figure 3:
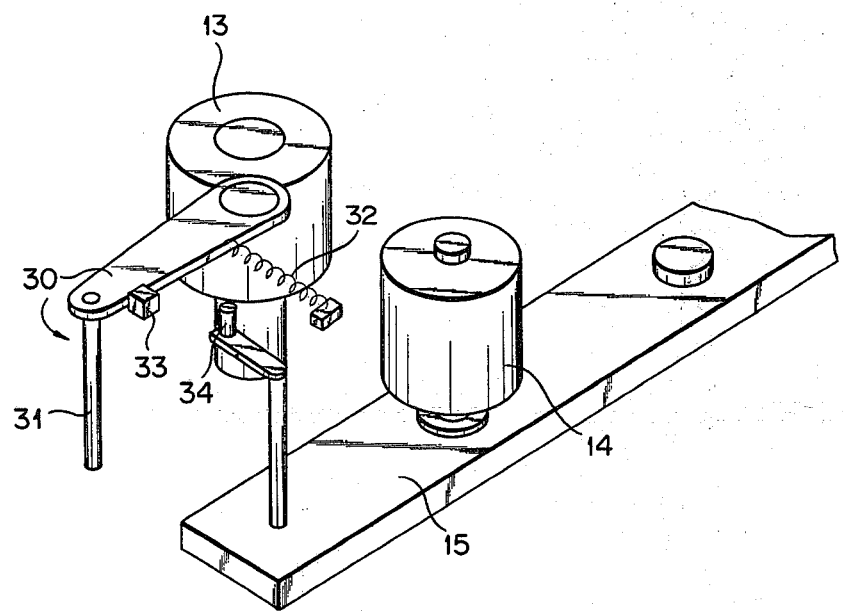
FIG. 3 is a fractional oblique view of said recording-reproduction apparatus.

Fitted to the underside of the upper wall of the housing 20 is the base end of a lever 30 which can be rotated along the surface of the underside of the upper wall. A downward projecting guide pin 31 is fixed to the free end of the rotatable lever 30. Connected, as shown in FIG. 3, to the rotatable lever 30 is one end of a tension spring 32, the other end of which is fixed to the housing 20. The rotatable lever 30 is normally urged by the tension spring 32 in the direction of the indicated arrow. Fixed to the underside of the upper wall of the housing 20 is a stop 33 which normally prevents the lever 30 from being rotated in the direction of the indicated arrow beyond the first prescribed position. A drive pin 34 (FIG. 3) is erected at the free end of the swingable arm 15 of the pinch roller 14 included in the drive mechanism 10.

When the pinch roller 14 is rotated to abut against the capstan 13, then the drive pin 34 causes the swingable lever 30 to be rotated in a direction opposite to that of the indicated arrow against the biasing force of the tension spring 32, thereby causing the guide pin 31 to be held in a second position. When set in the second position shown in FIG. 1, the guide pin 31 does not touch or press the tape 18, nor obstruct the run of the tape 18. When the swingable arm 15 is so rotated as to cause the pinch roller 14 to be removed from or shifted away from the capstan 13 to thereby draw up at least a portion of the slackened portion of the tape, then the guide pin 31 is rotated back to the first position to press the recorded plane of the tape 18 during the backward rotation, thereby releasing the tape 18 from the scanning mechanism and capstan 13 as indicated in two dots-dashed lines in FIG. 1.

Where, with the recording-reproduction apparatus of this invention arranged as described above, a tape run stop button (not shown) is pressed, then the motor is stopped to cease the rotation of the capstan 13. At this time, the swingable arm 15 is rotated to detach the pinch roller 14 from the capstan 13.

The removal of the pinch roller 14 from the capstan 13 is carried out at the point in time when the rotation of the capstan 13 is not completely brought to an end and the tape 18 still continues its run. A mechanism and/or electric circuit to define such point of time can be easily provided by those skilled in the art., description thereof therefore being omitted.

There will now be described the operation of the recording-reproduction apparatus of this invention.

While recording or reproduction is being conducted with the tape 18 driven in a state held between the capstan 13 and pinch roller 14, as shown in FIG. 1, then the guide pin 31 is set apart from the tape 18. When the stop button is pressed to remove the tape cassette 11 from the drive device 10, the pinch roller 14 which has pressed the capstan 13 up to this point of time is then released from the capstan 13 by the rotation of the swingable arm 15, just before the rotation of the capstan 13 is completely brought to an end. At the moment when the pinch roller 14 leaves the capstan 13, the tape 18 is made to run slightly forward. As a result, the tape 18 is somewhat slackened downstream of these drive members. When the swingable arm 15 is rotated, the guide pin 31 is rotated to the second position by means of the drive pin 34 and rotatable lever 30, causing the tape 18 to be removed or shifted from the scanning mechanism and tape drive mechanism. The removal of the tape 18 is carried out while the slackened portions thereof are straightened out, thereby applying no straining force to the tape 18 wound about the outer wall of the hollow fixed reel 23. After the guide pin 31 is rotated to the second position, the tape cassette 11 can be easily removed by being lifted substantially vertically from the drive device 10. Where the tape cassette 11 is again loaded onto the drive device 10, such loading is undertaken while the guide pin 31 is held in the first position. After the insertion of the tape cassette 11, recording or reproduction is carried out through the reverse sequence of operation steps from those applied in the insertion of the tape cassette 11.

With the foregoing embodiment, the guide pin 31 used for running of the tape 18 was driven by the pinch roller 14 and rotatable lever 30. However, the guide pin 31 may be driven independently of the pinch roller 14. The point is that the guide pin 31 is driven during running of the tape 18, after the tape 18 is somewhat slackened due to the pinch roller 14 being removed from the capstan 13 before its rotation is brought to an end. The shape of a guide member for running of a tape is not limited to that indicated by the guide pin 31. Further, the tapescanning mechanism and/or tape drive mechanism may be disposed outside of the hollow fixed reel 23.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A recording and/or reproduction apparatus for an endless tape comprising:
   a hollow fixed reel including an inner and outer wall, said outer wall being wound with said endless tape;
   guide means for conducting the innermost portion of the tape wound about the outer wall of the hollow fixed reel from the inner wall of said hollow fixed reel onto the outermost side of said wound tape;
   head mechanism for recording and/or reproducing operation of the tape thus guided; and
   a pinch roller and capstan which are driven with the tape held therebetween thereby causing the tape to form a slackened portion downstream of the capstan;
   pinch roller drive means for releasing the pinch roller from the capstan before rotation of the capstan is brought to an end and stopping of the tape running occurs, such that the slackened portion of the tape is partly drawn up; and tape portion biasing means for releasing the tape from the head mechanism when the pinch roller is released from the capstan for partly pulling the slackened portion of the tape, such that the slackened portion of the tape is removed after the tape running is stopped.

2. The recording and/or reproduction apparatus according to claim 1, wherein the head mechanism comprises a head slidingly contacting one plane of the tape and at least one guide member.

3. The recording and/or reproduction appartus according to claim 2, wherein the at least one guide member comprises a pair of guide members such that one guide member is positioned on both sides of the head.

4. The recording and/or reproduction apparatus according to claim 1, which further comprises a tape cassette provided with a housing for holding the hollow fixed reel, the guide means and the tape portion biasing means; and a drive device including a substrate for supporting the head mechanism, the pinch roller, the capstan, and the pinch roller drive means.

5. The recording and/or reproduction apparatus according to claim 4, wherein the tape portion biasing means further comprises a guide member rotatably received in the housing to engage a portion of the tape.

6. The recording and/or reproduction apparatus according to claim 5, wherein the pinch roller drive means comprises a support arm rotatably mounted on the substrate for rotatably supporting the pinch roller.

7. The recording and/or reproduction apparatus according to claim 6, which further comprises means for rotating the guide member when the support arm is rotatably driven.

8. The recording and/or reproduction apparatus according to claims 1, 2, 3, 4, 5, 6 or 7, which further comprises at least one rubber roller which contacts the bottom plane of the tape wound about the outer wall of the hollow fixed reel, thereby preventing the wound magnetic tape from being expanded by centrifugal force occurring when the wound tape is rotated.

9. A recording and/or reproduction apparatus for an endless tape according to claim 1 wherein said head mechanism, said pinch roller, said capstan and said tape portion biasing means are disposed within said inner wall of said hollow fixed reel.

* * * * *